INVENTORS
Reimar Pohlman
Roland Sievers

BY Michael S. Striker
Atty

United States Patent Office 3,426,951
Patented Feb. 11, 1969

3,426,951
ULTRASONIC WELDING APPARATUS
Reimar Pohlman, Darmstadt, and Roland Sievers, Heppenheim an der Bergstrasse, Germany, assignors to Dr. Lehfeldt & Co. G.m.b.H., Heppenheim an der Bergstrasse, Germany
Filed Oct. 31, 1962, Ser. No. 234,478
Claims priority, application Germany, Nov. 6, 1961, L 40,405; Jan. 25, 1962, L 41,049
U.S. Cl. 228—1                18 Claims
Int. Cl. B34k 1/06, 5/20

The present invention relates to ultrasonic welding.

As is well known, it is possible to weld materials to each other with the use of ultrasonic vibratory energy. Metals, plastics, and even paper can be welded to each other with the use of such energy. Conventionally, the ultrasonic vibratory energy is applied to the elements which are to be welded through the tip of the sonotrode of the ultrasonic welding machine, and these machines may be used either for spot welding or for providing continuous weldments.

The welding or fusing of the sheets or the like which are to be welded to each other takes place because the ultrasonic vibratory energy provides between the elements which are to be welded a frictional rubbing which causes the material of the elements to be welded to fuse to each other at the point or localized area to which the ultrasonic vibratory energy is transmitted. There is a certain difficulty in conventional apparatus of this type, however, resulting from the fact that there is also in many cases a frictional rubbing between the tip of the sonotrode and one of the elements which is to be welded, resulting in undesirable welding of the material to the tip of the sonotrode itself, and this of course is a source of extreme inconvenience necessitating interruptions in the operations to separate the material which is worked from the tip of the sonotrode and also frequently requiring cleaning of the tip of the sonotrode so that there is a serious drawback resulting from the tendency of the sonotrode tip itself to become welded with the work material.

It is accordingly a primary object of the present invention to provide a sonotrode welding process and apparatus which will reliably prevent welding of the work material to the tip of the sonotrode.

A further object of the present invention is to provide the tip of the sonotrode with a structure which will inhibit fusing between the tip of the sonotrode and the work material. More particularly, it is an object of the invention to provide the tip of the sonotrode with a structure which will reliably avoid any relative movement between the tip of the sonotrode and the work material during the welding of the latter, so that as a result of the lack of any movement between the work material and the sonotrode tip there will be no welding therebetween.

It is furthermore an object of the present invention to provide a welding structure which will give to the operator the possibility of selecting for particular work materials sonotrode tips, and also anvil materials, which are least likely to result in welding of the work material to the sonotrode tip or anvil.

Still another object of the present invention is to provide a process for operating a welding machine of the above type in such a way that even if there should be any welding of the work material to the tip of the sonotrode, there nevertheless will be a reliable separation between the sonotrode tip and the work material at the end of the welding operation.

The objects of the present invention also include the provision of a structure which will operate in a fully automatic manner in such a way as to separate the sonotrode tip from the work material in the event that there should be any fusion therebetween.

With these objects in view the invention includes, in an ultrasonic welding machine, a sonotrode tip having a rough surface which when pressed against the work material will have substantially no possibility of moving relative thereto. The tip of the sonotrode for this purpose may be made of a coarse open-grain structure, and also this surface may be striated, and in addition the material of the sonotrode tip may have the property of being non-alloyable with respect to the material which is welded. In accordance with the process of the invention, the transmission of the ultrasonic vibratory energy to the tip of the sonotrode is maintained for a short period of time, on the order of a fraction of a second, after the pressure between the tip of the sonotrode and the work material has been terminated, so that this additional transmission of ultrasonic vibratory energy when there is no pressure between the work material and the tip of the sonotrode will separate the latter from the work material in the event that there should have been any slight fusion between the sonotrode tip and the work material, in spite of the above measures taken with respect to the structure of the sonotrode tip itself. According to a particular feature of the invention both the transmission of ultrasonic vibratory energy and the pressure between the sonotrode and the work material are terminated substantially simultanteously and then immediately thereafter additional vibratory energy is provided at the tip of the sonotrode for a fraction of a second so as to guarantee separation between the work material and the sonotrode tip in the event that any welding has occurred.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
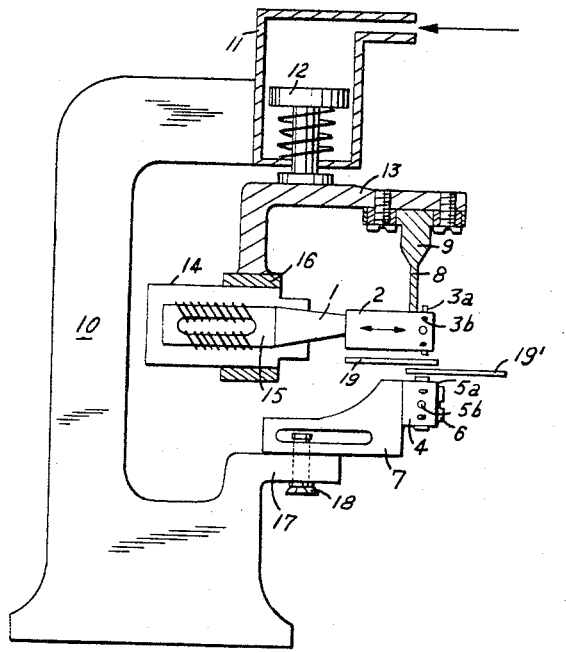
FIG. 1 is a schematic, partly sectional, side elevation of a welding machine according to the present invention.

Referring to FIG. 1, there is schematically illustrated therein a complete ultrasonic welding machine which includes the supporting framework 10 which is very rugged and made of iron, for example. The upper part of the framework 10 carries, as shown diagrammatically in FIG. 1, the cylinder 11 of a fluid-pressure device adapted to operate with compressed air, and within the cylinder 11 is located the piston 12 which slides in the cylinder 11, and beyond the bottom wall of the cylinder 11 the piston 12 is fixed with the holder 13 which carries the ultrasonic welding head 14. Within the ultrasonic welding head 14 is located the magnetostrictive vibrator 15 in the form of and endless member which may be made of suitable laminations and which has coils cooperating therewith, as indicated in FIG. 1, so that the high frequency alternating current will result in elongation and contraction of the vibrator 15 at the frequency of the alternating current, as is well known in the art. Fixed with the vibrator 15 is an amplitude amplifier 1 which in turn has the sonotrode 2 threaded thereon. The entire head 14 is turnable in the bearing 16 forming the lower part of the holder 13, so that the sonotrode 2 is in the form of a rotary member turnable about the longitudinal axis of the sonotrode, and at its right end portion, as viewed in FIG. 1, which engages the material to be welded, the sonotrode 2 carries a plurality of different tips 3a, 3b, etc. which are distributed about the axis of the sonotrode and extend radially with respect to this axis, so that by turning the welding head in the bearing 16 it is possible to place in engagement with the work material 19 a selected sonotrode tip which will have with respect to the work material 19 properties which will substantially eliminate any tendency for the work material 19 and the sonotrode tip to become welded to each other. This structure is also shown on an enlarged scale in FIG. 2, and in addition FIGS. 1 and 2 show horizontal arrows which indicate the direction of vibration of the ultrasonic welding structure during transmission of the ultrasonic vibratory energy to the material which is to be welded.

Beneath the tip of the sonotrode is located the anvil 4 which is also in the form of a rotary member similar to a turret and which also carries elements 5a, 5b, etc. which are distributed about the axis of the rotary anvil member 4 and which extend radially with respect to this axis, the several elements 5a, 5b, etc. respectively having properties which with respect to various work materials will greatly reduce any tendency for welding to take place between the work material and the elements 5a, 5b, etc., so that by selecting one of these latter elements to engage the work material the operator can greatly reduce any tendency for the material to become welded to the anvil. The rotary anvil member 4 is turnably carried by an elongated bolt 6 on which the rotary member 4 is turnable, and in this way a selected element 5a, 5b, etc. may be placed at the uppermost part of the anvil to engage the underside of the work material 19'. The bolt 6 is threaded into a holder 7 which is in turn carried by the portion 17 of the base of the framework 10, and for this purpose a screw 18 extends through a bore of the arm 17 and through an elongated slot formed in a lower wall portion of the holder 7, the holder 7 also having between its upper and lower surface portions a slot extending completely through the holder 7 and giving access to a nut which is on the upper threaded end of the screw 18, so that with a suitable wrench the operator has access to this nut for loosening or tightening the screw 18 by thus rendering it possible to adjust the position of the holder 7 and thus the anvil 4. The work material 19, 19' is placed between the anvil 4 and the sonotrode 2, and when pressed between the anvil 4 and the sonotrode 2, the application of the ultrasonic vibratory energy will provide vibrations in the directions of the arrows shown in FIGS. 1 and 2, as described above, in order to carry out the welding.

Figure 2:
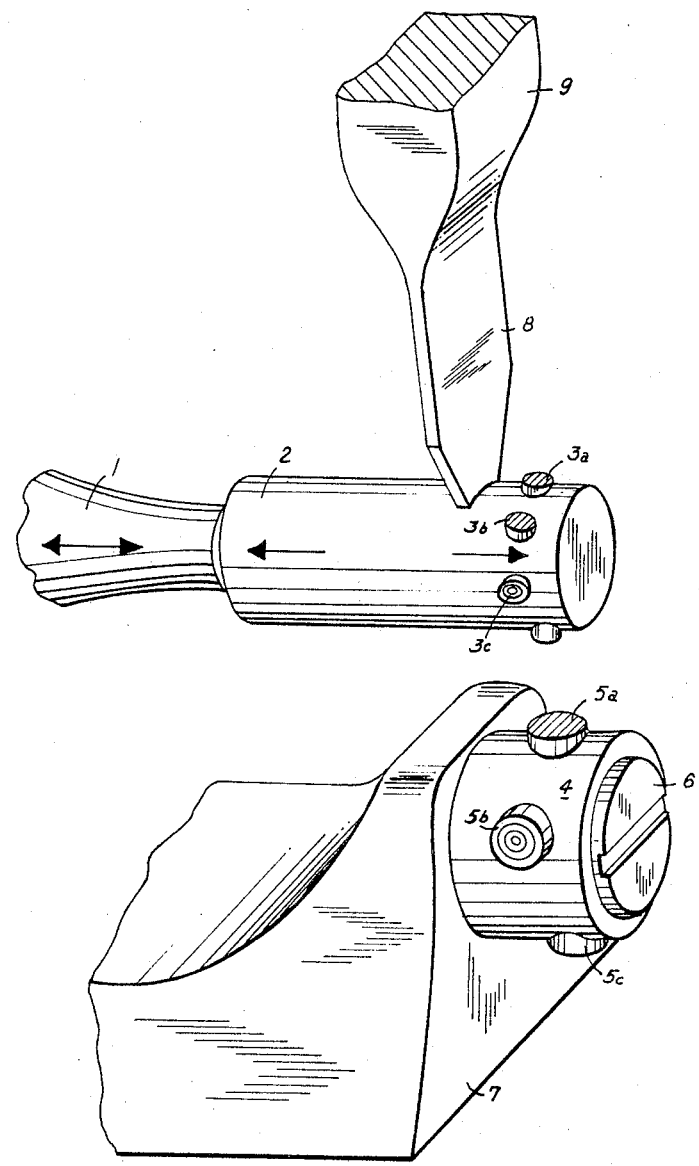
FIG. 2 shows in an enlarged view a perspective illustration of those parts of the welding machine which engage the work material and which are provided with the structure of the invention.

The most important parts of the structure of the invention are shown on an enlarged scale in FIG. 2 from which may be seen the rotary sonotrode 2 and the rotary anvil member 4, as well as the amplitude amplifier 1, and also the holder 7 which carries the bolt 6 on which the rotary anvil member 4 is turnable. Also, FIG. 2 shows the sonotrode tip elements 3a–3c, it being understood that there are additional elements distributed uniformly all around the axis of the sonotrode, and furthermore the anvil elements 5a–5c are shown, and of course there is an additional anvil element which is not visible in FIG. 2 and which may be selectively placed in the upper position to engage the underside of the work material.

FIG. 2 also shows the relatively thin metal fin 8 which is located in a plane perpendicular to the direction of vibration of the sonotrode and which serves to transmit to sonotrode 2 the pressure for applying the same against the work material. The upper, thicker portion 9 of the member 8 is adjustably carried by the holder 13 in the manner shown in FIG. 1. Thus, a pair of screw members threadedly carried by the holder 13 extend through slots of the member 9, with the heads of the screw members being too large to pass through the slots, so that by tightening and loosening the screw members shown in FIG. 1 it is possible to adjust the position of the pressure-transmitting fin 8 with respect to the axis of the sonotrode 2. When air under pressure is introduced into the cylinder 11 to depress the piston 12 in opposition to the spring shown in FIG. 1 urging the piston 12 back to its rest position, not only the piston 12 but also the holder 13 will be moved downwardly, and the downward force will be transmitted through the fin 8 to the sonotrode 2 for pressing the latter against the work material with the pressure necessary to effect the desired welding, and while the metal fin 8 is relatively thin, nevertheless its thickness is great enough to reliably prevent any buckling of the pressure-transmitting fin 8 during the welding operations.

Figure 3:
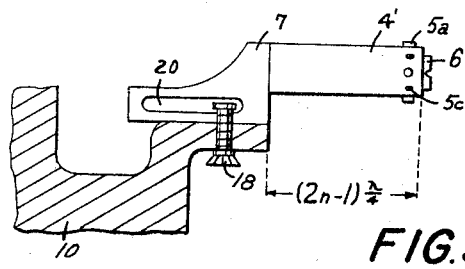
FIG. 3 is a partly sectional side elevation of an embodiment of an anvil which is particularly suited for welding difficult work material at places which have difficult accessibility.

FIG. 3 shows a structure which is suitable in the case where the location of the welding operations are difficult to get at. Thus, with this construction the holder 7 carries an elongated screw member or bolt 6 on which the much longer rotary anvil member 4' is located, this rotary anvil member 4' carrying the several elements 5a–5c as described above, and because of the longer length of the rotary anvil member and the arm 6, 7 which carries the same, it is possible to provide the welding vibrations at relatively inaccessible locations. Of course, it is important that the anvil, in contrast to the sonotrode, have little or no vibrations, and for this purpose the length of the rotary anvil member 4', and thus of the arm 6 which supports the same, is equal to a non-integral multiple of a quarter-wave-length of the resonant frequency of vibration of the particular material which is used for the anvil, so that there will be little or no tendency for the anvil to vibrate. In the position of the parts shown in FIG. 3, the holder 7 has been shifted rearwardly, with respect to the position thereof shown in FIG. 1, and the slot 20 of FIG. 3 gives access to the nut carried by the screw 18, as described above. It is possible with the structure of FIG. 3 to weld areas which are of difficult accessibility because the anvil 4 with this construction need only have a diameter of a relatively few centimeters.

During welding the anvil should of course be as free as possible of vibrations while the sonotrode transmits the ultrasonic vibrations to the work material, and when welding plastics the vector of the ultrasonic vibrations is directed perpendicularly with respect to the surfaces which are welded to each other while with most other materials, particularly metals, the vector of the vibrations extends parallel to the surfaces which are to be welded to each other.

In accordance with the present invention it is highly important to provide between the tip of the sonotrode and the work material an extremely fast connection in order to improve the efficiency of the welding operations, and in addition a support of the sonotrode which is as free of damping as possible in order to provide the desired pressure is also important. Where there is a practically fixed relationship between the tip of the sonotrode and the work material there will be not only practically 100% transmittal of the ultrasonic vibratory energy to the location where the welding is desired to take place, but in addition there will be an elimination of the undesired welding of the tip of the sonotrode to the work material because as a result of the substantially fixed relationship between the tip of the sonotrode and the work material there cannot take place between the work material and the tip of the sonotrode the relative movement which provides the friction required for the welding to occur. The same considerations apply, although to a lesser extent, to the anvil.

In order to provide a coupling or connection between the tip of the sonotrode and the work material which will approach as closely as possible to a fixed connection between these parts, it is advisable, in accordance with the present invention, to use for the material of the tip of the sonotrode a material which has a large, coarse, open grain structure, such as, for example, cast iron, and in addition the tip of the sonotrode can be provided at its surface with striations in the form of minute grooves of substantially V-shaped cross section which are so small that they can be spaced with respect to each other by a distance of 0.1–0.5 mm., so that in this way the tip of the sonotrode has a rough surface of a high coefficient of friction. The striations on the exterior surface of the tip of the sonotrode can extend perpendicularly to the direction of the vibrations, or in the case of a spherical sonotrode tip these striations can be cut into the surface of the sonotrode so as to extend along circles. It is not absolutely essential to provide the immovable relationship between the tip of the sonotrode and the work material by artificially forming striations in the tip of the sonotrode, since it is also possible to use materials whose surfaces are naturally rough, such as, for example, cast iron which is cast with a skin which is particularly rough and irregular, so that when such a material is used for the tip of a sonotrode its natural roughness at the exterior surface of the tip of the sonotrode will provide the desired, practically fixed coupling between the tip of the sonotrode and the work material. Moreover, the material used for the tip of the sonotrode should have practically no or very llittle Van der Waal attractive forces with respect to the work material. The extremely rigid connection between the tip of the sonotrode and the work material, provided by pressing against the work material a rough or striated surface of the sonotrode tip during the welding operations, are also used in accordance with the present invention, with materials for the tip of the sonotrode which do not tend to become alloyed with the work material. In other words, the material used for the tip of the sonotrode and the material which is welded are of such different types that they do not form alloys with each other, and thus when using such materials there will be no tendency for welding to take place between the tip of the sonotrode and the work material even during the best possible transmission of the ultrasonic vibratory energy. Material suitable for this purpose, beside cast iron, which has been mentioned above, include molybdenum, beryllium, titanium, tungsten, chromium, or a chrome-steel alloy, and in addition sintered or other hard materials such as a ceramic selected from the group consisting of oxides, nitrides and carbides of aluminum, beryllium, iron, boron, silicon, molybdenum, titanium and tungsten, such ceramics being, for example, aluminum oxide, beryllium oxide, iron nitride, aluminum carbide, beryllium carbide, iron carbide, boron carbide, silicon carbide, molybdenum carbide, titanium carbide and tungsten carbide. Moreover, it is possible to use aluminum or aluminum-plated metal pieces, and to provide at the exterior surface of the sonotrode tip, which engages the work material, a hard strong layer or coating resulting from the Eloxal process, involving the electrolytic oxidizing of aluminum.

Also, in accordance with the present invention, the tip of the sonotrode can be made of semi-precious or precious stone, which may be mounted in a suitable metal block, and in order to avoid chipping or splitting of the stone, it is carried by the metal block in such a way that it projects beyond the block for a distance equal only to a few tenths of a millimeter.

In some cases the material to be welded includes decorative strips or the like, and for such situations the surface of the anvil which engages the work material has such properties that it will protect the surface of the work material so that the surface of a decorative strip, for example, will not be marred by the welding operations. For this purpose ferrite, polymerized tetrafluoro ethylene, or other materials of sufficient hardness and smoothness can be used.

Of course, it is of particular advantage to provide a structure where the operator can select a particular tip both for the sonotrode and for the anvil which is suited to the particular material which is being welded, and the above-described structure according to which the selected sonotrode tip and a selected anvil tip can be applied to the welding material enables such a selection to be made by the operator.

As was pointed out above, the relatively thin fin 8 is used to transmit the pressure to the sonotrode for pressing the same against the work material, and as is apparent from FIG. 1, and as was described above, the thicker portion 9 is adjustable relative to the holder 13, this adjustability enables the lower end of the fin 8 to engage the sonotrode as close as possible to its tip, at the place where the loops of the vibrations, as distinguished from their nodes, occur, so that in this way the pressure is applied at the best possible location.

As is also pointed out above, the anvil should have no or very little vibrations, and for this purpose the length of the anvil, as indicated in FIG. 3, is a non-integral multiple of a quarter-wave-length of the resonant frequency of the material of the anvil so that it will have no tendency to vibrate.

In many cases, in spite of the above measures, it will sometimes happen that there will be a tendency of the work material to become welded to the tip of the sonotrode, and for this purpose the steps illustrated in FIGS. 4–7 may be used, in accordance with the present invention.

Figure 4:
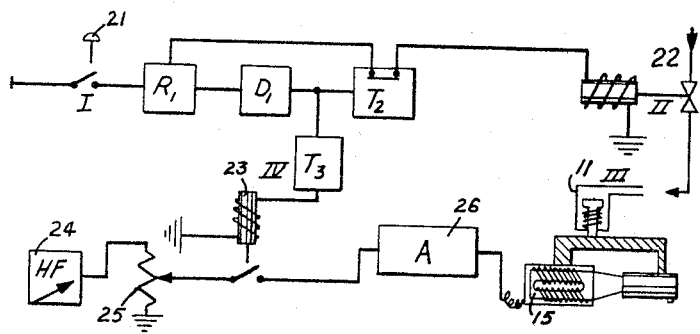
FIG. 4 is a schematic wiring diagram of the structure for controlling the welding machine of the invention.

Referring to FIG. 4, there is shown therein a foot-switch 21 which is used by the operator to initiate the welding operation, and the illustrated machine and wiring diagram relate to a structure which is used for spot welding. The switch 21 controls by a relay $R_1$ a magnetically operated valve 22 which controls the admission of air into the cylinder 11. Thus, when the operator closes the switch 21 air will be admitted through the valve 22 into the cylinder 11 so that the holder 13 will move down and through the fin 8 will press the sonotrode against the work material which is also pressed against the anvil, in this way. Through a delaying unit $D_1$ the timing switches $T_2$ and $T_3$ are set into operation, and the timing switch $T_2$ operates the magnetic valve 22 after a given welding period so as to terminate the introduction of the air under pressure into the cylinder 11 and permit this air to discharge to the outer atmosphere so that the pressure between the work material, on the one hand, and the sonotrode and anvil, on the other hand, is terminated. The timing switch $T_3$, however, is controlled, in accordance with the present invention, through the relay 23 which is energized by the high frequency generator 24 and through an adjustable potentiometer transmits an adjusted high frequency voltage to the amplifier 26, so as to energize the magnetostrictive transducer 15 which converts the alternating current into mechanical vibrations, as is well known in the art. The timing switch $T_3$ is so adjusted that the high frequency voltage is terminated somewhat later than the termination of the pressure by the timing switch $T_2$, so that the sequence and duration of operations shown in FIG. 5 is provided.

Figure 5:
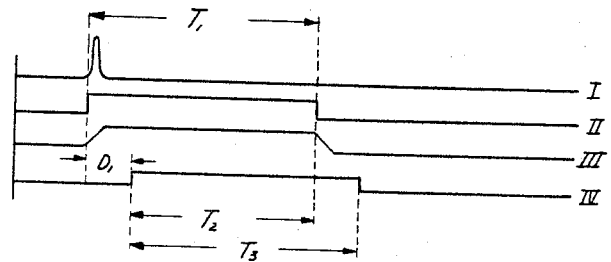
FIG. 5 is a diagrammatic illustration of the sequence and duration of the various operations provided with the control arrangement of FIG. 4.

In FIG. 5, the line I designates the duration of operation of the foot-switch 21, while the line II designates the duration of time during which the magnetic valve 22 is maintained open. The line III indicates the pressure in the cylinder 11, and the line IV indicates the high frequency excitation of the ultrasonic generator 15. It will be noted from FIG. 5 that the high frequency excitation is delayed by a time period $D_1$ with respect to the energizing of the relay $R_1$ by the closing of the switch 21, so that the workpieces are pressed against each other and between the sonotrode and anvil when the excitation of the transducer 15 takes place. The switch $T_2$ deenergizes the magnetic valve 22 and releases the pressure from the cylinder 11, and the switch $T_3$ is adjusted for a longer period of time, as is evident from the lower part of FIG. 5, so that the ultrasonic vibrations are still in operation and are still effective when the pressure between the sonotrode and the work material has been relieved. As a result of the transmission of ultrasonic vibrations between the tip of the sonotrode and the work material after the pressure between the sonotrode and work material has been eliminated, the work material will become separated from the tip of the sonotrode even if any welding has taken place between these parts.

Figure 6:
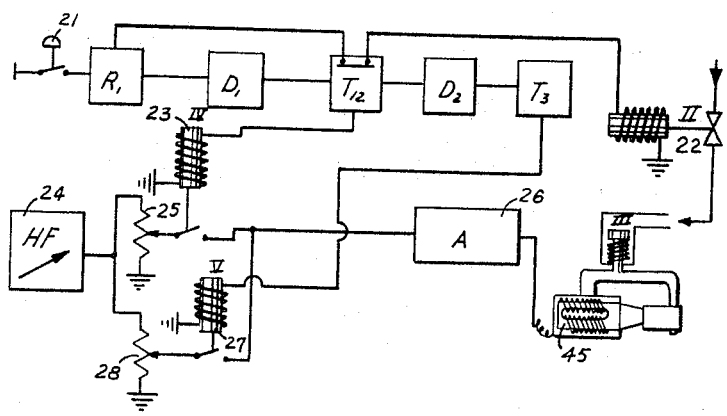
FIG. 6 is a schematic wiring diagram of another embodiment of an electrical structure for controlling the welding machine.
Figure 7:
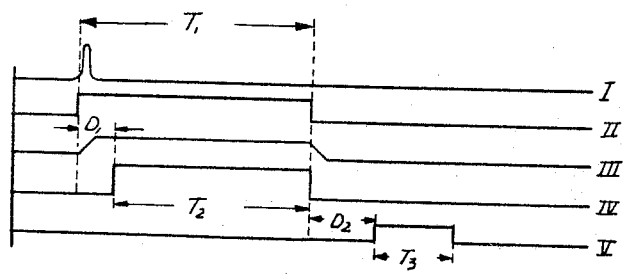
FIG. 7 is a diagrammatic illustration of the sequence and duration of the operations provided with the control structure of FIG. 6.

FIGS. 6 and 7 illustrate another possible arrangement in accordance with the present invention. All the parts described above in connection with FIG. 4 are present in FIG. 6 and operate in the same way. FIG. 6 includes, however, in addition to the parts and described above in connection with FIG. 4, a further delaying unit $D_2$ which permits the timing switch $T_3$ to work on the relay 27 which through the adjustable potentiometer 28 directs the adjusted high frequency current to the amplifier A for the purpose of exciting the transducer 15.

FIG. 7 shows diagrammatically the sequence and duration of the operations provided with the structure of FIG. 6, and in FIG. 7 the line I is again an illustration of the operation of the foot-switch 21, the line II the operation of the valve 22, the line III the pressure in the cylinder, and the line IV the delayed excitation of the transducer 15, this delay $D_1$ being on the order of 0.1 sec., for example. After the period $T_2$ the excitation of the transducer 15 is terminated. The termination of the operations described above by the switches $T_1$ and $T_2$ sets into operation the delay unit $D_2$, which at a short period thereafter starts the timing switch $T_3$ which through the relay 27 provides an additional energizing of the transducer with the adjustment provided by the potentiometer 28 so that there is transmitted at this time to the transducer a current of lesser frequency which reaches the transducer 15 through the amplifier 26. As may be seen from the line V in FIG. 7, the additional impulse provided after the delay period $D_2$ for the time period $T_3$ is of lesser intensity than the excitation which takes place during the period $T_2$.

Thus, with the embodiment of FIGS. 4 and 5 the excitation of the transducer 15 will be terminated at a short period of time, on the order of 0.1 sec., for example, after the termination of the pressure between the sonotrode and the work material, whereas with the embodiment of FIGS. 6 and 7, which for many purposes is preferred, the excitation of the transducer is terminated simultaneously with or slightly before the pressure between the sonotrode and the work material, and instead after a short period there is a second excitation of the transducer for a short period of time. Thus, with the embodiment of FIGS. 6 and 7 after the termination of the pressure and the excitation of the transducer 15, there is after extremely short moment, an almost immediately additional excitation of the sonotrode for a short period of time when the sonotrode and the work material no longer press against each other, and it is possible to very accurately regulate both the time and intensity of the additional excitation so that it will suffice to separate the sonotrode and the work material if they should stick to each other. The structure is designed to provide such an additional impulse after each spot welding operation, whether or not there is any sticking between the work material and the sonotrode tip. The additional impulse is of course of smaller intensity than that used during the welding since for the purpose of separating work material which happens to stick to the tip of the sonotrode a substantially lesser vibratory energy is required than for the welding. Thus, the amplitude of the additional impulse is adjusted so that it is suited to the intended purpose.

With an ultrasonic welding machine constructed as described above it is possible to weld with a high frequency electrical power of 2 kw. aluminum sheets having a thickness of 3 mm. in a manner providing a highly reliable fusion between the sheets. This is in contrast with conventional resistance welders which require much more power in order to effect corresponding welding of aluminum sheets of the same thickness. Actually, the amount of power required with the invention is approximately 1/50 of that required for conventional resistance welding.

It will be understood that each of the elements described above, or two or more together, may also find a useful application in other types of welding machines differing from the types described above.

While the invention has been illustrated and described as embodied in ultrasonic welding machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for welding ultrasonically, a sonotrode having a tip provided with striations forming a rough surface having projections spaced from each other at a distance of at least one-tenth of a millimeter and which engages the material which is to be welded and which when pressed against the material will, because of its rough surface, substantially eliminate any relative movement between the material which is to be welded and the tip of the sonotrode.

2. In an ultrasonic welding machine as set forth in claim 1, wherein said sonotrode tip is made of a material which is non-alloying with the material which is to be welded.

3. In an ultrasonic welding machine as set forth in claim 1, wherein said sonotrode has a tip made of a material selected from the group consisting of cast iron, molybdenum, beryllium, titanium, tungsten, chromium, or a chrome-steel alloy.

4. In an ultrasonic welding machine as set forth in claim 1, wherein said sonotrode has a tip made of a ceramic selected from the group consisting of oxides, nitrides, and carbides of aluminum, beryllium, iron, boron, silicon, molybdenum, titanium and tungsten.

5. In an ultrasonic welding machine as set forth in claim 1, in which the striations of the tip of the sonotrode extend perpendicularly with respect to the direction in which the sonotrode vibrates.

6. In an ultrasonic welding machine as set forth in claim 1, in which said striations have a circular configuration.

7. In an apparatus for welding ultrasonically, a sonotrode having a tip provided with a rough surface having projections spaced from each other at a distance of at least one-tenth of a millimeter and which engages the mateiral which is to be welded and which when pressed against the material will, because of its rough surface, substantially eliminate any relative movement between the material which is to be welded and the tip of the sonotrode, said sonotrode tip being made of a ductile wear-resistant material and which has a coarse and irregular open granular structure at its surface providing the rough surface at the tip of the sonotrode.

8. In an ultrasonic welding machine as set forth in claim 7, wherein said sonotrode tip is a casting having a rough skin.

9. In an ultrasonic welding machine as defined in claim 7 and including an anvil also engaging the material to be welded, said anvil being made of a hard, smooth material which will protect the material which is to be welded at the surface thereof which engages the anvil.

10. In an ultrasonic welding machine as defined in claim 9, wherein said anvil is made of ferrite.

11. In an ultrasonic welding machine as defined in claim 9, wherein said anvil is made of polymerized tetrafluoro ethylene.

12. In an apparatus for welding ultrasonically, a sonotrode having a tip provided with a rough surface having projections spaced from each other at a distance of at least one-tenth of a millimeter and which engages the material which is to be welded and which when pressed against the material will, because of its rough surface, substantially eliminate any relative movement between the material which is to be welded and the tip of the sonotrode, said sonotrode tip being made of a ductile wear-resistant material and which has a coarse and irregular open granular structure at its surface providing the rough surface at the tip of the sonotrode, and the material of the tip of the sonotrode being non-alloying with respect to the material which is to be welded.

13. In an ultrasonic welding machine, in combination, a sonotrode tip and an anvil both adapted to engage the material to be welded, the material to be welded being pressed between the sonotrode tip and anvil during the welding thereof, and said sonotrode tip and anvil both having a striated surface having projections spaced from each other at a distance of at least one-tenth of a millimeter, said striated surface being in engagement with the material to be welded to substantially prevent any relative movement between the material to be welded and the sonotrode tip and anvil.

14. In an ultrasonic welding machine, a sonotrode terminating in a rotary resonance member carrying a plurality of sonotrode tips extending radially with respect to and distributed about the axis of turning of said rotary resonance member and said tips respectively having projections forming exterior, material-engaging surfaces of different properties which are respectively suited for different materials to transmit vibrations thereto without a tendency of the sonotrode tip to become welded to the material which is being welded while at the same time substantially preventing any relative movement between the sonotrode tip and the material which is being welded, whereby the rotary resonance member may be turned to place in engagement with the material to be welded a selected tip whose properties are best suited for the particular material which is being welded.

15. In an ultrasonic welding machine, a sonotrode terminating in a rotary resonance member carrying a plurality of sonotrode tips extending radially with respect to and distributed about the axis of turning of said rotary resonance member and said tips respectively having projections forming exterior, material-engaging surfaces of different properties which are respectively suited for different materials to transmit vibrations thereto without a tendency of the sonotrode tip to become welded to the material which is being welded while at the same time substantially preventing any relative movement between the sonotrode tip and the material which is being welded, whereby the rotary resonance member may be turned to place in engagement with the material to be welded a selected tip whose properties are best suited for the particular material which is being welded; and an anvil also carrying a rotary member which in turn carries a plurality of material-engaging elements of different surface properties so that a selected element of the anvil may also be placed in engagement with the material to be welded.

16. In an ultrasonic welding machine, a sonotrode terminating in a rotary resonance member carrying a plurality of sonotrode tips extending radially with respect to and distributed about the axis of turning of said rotary resonance member and said tips respectively having exterior, material-engaging surfaces of different properties which are respectively suited for different materials to transmit vibrations thereto without a tendency of the sonotrode tip to become welded to the material which is being welded while at the same time substantially preventing any relative movement between the sonotrode tip and the material which is being welded, whereby the rotary resonance member may be turned to place in engagement with the material to be welded a selected tip whose properties are best suited for the particular material which is being welded; and an anvil also carrying a rotary member which in turn carries a plurality of material-engaging elements of different surface properties so that a selected element of the anvil may also be placed in engagement with the material to be welded, said rotary member of said anvil being carried by an elongated arm which projects from the body of the remainder of the anvil and which supports the rotary member for rotation, said arm and said rotary member thereon having a length which is equal to a non-integral multiple of a quarter-wave-length of the vibration characteristic of the material of the arm and rotary member.

17. In an apparatus for ultrasonic welding, a sonotrode; and a relatively thin metal fin adapted to engage with an end thereof the sonotrode for pressing the latter against the material to be welded, said metal fin being located in a plane which is perpendicular to the direction in which the sonotrode vibrates and said metal fin having a thickness great enough to prevent buckling of the fin when it applies the required pressure to the sonotrode.

18. An ultrasonic welding machine, comprising, in combination, support means; an anvil mounted on said support means and adapted to engage the material to be welded on one side thereof; a sonotrode having one sonotrode tip located opposite said anvil and being mounted on said support means movable between an inactive position and an active position in which said tip engages the other side of the material to be welded; pressure means on said support means and operatively connected to said sonotrode for moving the latter between said inactive and said active positions and for pressing in said active position said tip against the other side of said material; energizable transducer means operatively connected to said sonotrode for vibrating the latter when energized; electrical actuating means for actuating said pressure means; energizing means for energizing said transducing means; and circuit means for connecting said electrical actuating means and said energizing means to a source of electrical energy and including an operator controlled switch for momentarily closing said circuit means and a pair of timing switch means respectively in circuit with said electrical actuating means and said energizing means for maintaining after each operation of said operator controlled switch said sonotrode by means of said pressure means for a given time period in said active position while said transducer means is energized and for additionally energizing the latter during a short period after termination of pressure by said pressure means on said sonotrode.

References Cited

UNITED STATES PATENTS

| 3,052,020 | 9/1962 | Jones et al. | 29—470.1 |
| 3,090,116 | 5/1963 | Burgess | 29—470.1 |
| 3,053,124 | 9/1962 | Balamuth et al. | 78—82 |
| 3,088,343 | 5/1963 | Balamuth et al. | 78—82 |
| 2,985,954 | 5/1961 | Jones | 78—82 |
| 621,097 | 3/1899 | Keim | 83—552 |
| 3,039,333 | 6/1962 | Jones | 78—92.1 |
| 3,051,027 | 8/1962 | Kuris | 78—92.1 |
| 2,425,913 | 8/1947 | Beard | 78—61 |
| 2,906,150 | 9/1959 | Stewart | 78—61 |

CHARLES W. LANHAM, *Primary Examiner.*

G. P. CROSBY, *Assistant Examiner.*